3,458,508
ORGANO-MERCURY DERIVATIVES OF ISOCYANURIC ACID
Jean Pomot, 33 Rue Saint-Jammes-75, Neuilly-sur-Seine, France, Robert Amanrich, 27 Rue Auriol-31, Toulouse, France, and Gilbert Cousserans, 22 Allees de Guyenne-31, Toulouse 03, France
No Drawing. Original application Aug. 31, 1966, Ser. No. 576,228. Divided and this application Nov. 21, 1967, Ser. No. 714,372
Int. Cl. C07f 3/14; C07d 55/38; A01n 21/04
U.S. Cl. 260—242
11 Claims

ABSTRACT OF THE DISCLOSURE

Organo-mercury derivatives of isocyanuric acid in which 1–3 of the nitrogens are substituted with organo-mercury substituents and those nitrogens not containing such substituents are unsubstituted or substituted with aliphatic substituents. The compounds are useful as fungicides.

---

This application is a division of application Ser. No. 576,228, filed Aug. 31, 1966, now abandoned.

The present invention relates to N-di- or -tri-substituted organo-mercury derivatives, to the preparation thereof, and to their use more especially as highly active fungicides, the toxicity of which to warm-blooded animals and the phytotoxicity are, depending upon their composition, appreciably lower than those of known organo-mercury fungicides.

The empirical formula of the new derivatives is $$(CNO)_3H_mX_nY_p \quad (I)$$

wherein X is an N-substituent and is a monovalent lower alkyl-mercury, lower alkenyl-mercury, aryl-mercury or alkylaryl-mercury radical R—Hg—, and Y is an N-substituent and is a monovalent radical such as —SCCl$_3$, —(CH$_2$)$_x$CH$_2$OH, —CH$_2$CH=CH$_2$, —(CH$_2$)$_2$CN, —(CH$_2$)$_3$NH$_2$, —(CH$_2$)$_2$COOH, etc., $x$ being less than or equal to 3, $m$ being zero or 1, and $n$ being 1, 2 or 3, $p$ being defined by the expression $m+n+p=3$. Where $n$ is greater than 1, the radicals R of substituents X can be the same or different radicals comprised within the aforesaid definition of R.

The new compounds I are prepared by the action on N-substituted or N-unsubstituted cyanuric acid, of organo-mercuric halide and more especially of organo-mercuric chloride in an aqueous medium containing a certain proportion of a water-miscible solvent for the organo-mercuric halide, or in an anhydrous medium containing organo-mercuric hydroxide and being a complete or partial solvent for the two reagents.

By the use of organo-mercuric halides as substitution reagents, it is possible to prepare an entire series of N-di- or -tri-substituted organo-mercury derivatives of isocyanuric acid as hereinbefore defined (Formula I), the substituents being identical or different. On the other hand, in the case of identical substituents, the use of organo-mercuric hydroxides results exclusively in N-tri-substituted derivatives, regardless of the molar hydroxide: cyanuric acid ratio.

The first method of preparation consists, in principle, in suspending cyanuric acid—or an N-mono- or di-substituted derivative of isocyanuric acid—in an aqueous medium containing 5 to 20% by weight of a solvent for the orango-mercuric halide employed (dimethylformamide, dioxane, alcohols, etc.), and then, with the pH maintained constantly at a value between 6 and 14 and, more especially, between 6 and 9, by the addition of a base, for example an aqueous solution of sodium hydroxide or potassium hydroxide, progressively introducing the organo-mercuric halide in stoichiometric proportion corresponding to the derivative to be obtained and while keeping the temperature between 50 and 100° C. Upon completion of the reaction, the insoluble product is separated from the reaction medium by filtration or centrifuging, etc., and is washed and dried.

The identical result is obtained by adding the organo-mercuric halide in the form of a solution in a water-miscible solvent, to an aqueous medium containing the substituted or unsubstituted cyanuric acid, at a pH above 6. Such a procedure is readily adapted to a commercial scale, with continuous operation as hereinafter exemplified in Example 2.

The reaction schemes in the various cases can be visualized as follows:

(a) (CNOH)$_3$+2RHgCl+2NaOH→
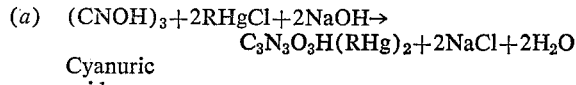
Cyanuric acid (b) (CNOH)$_3$+3RHgCl+3NaOH→
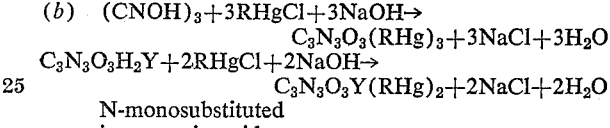
N-monosubstituted isocyanuric acid (d) C$_3$N$_3$O$_3$HY$_2$+RHgCl+NaOH→
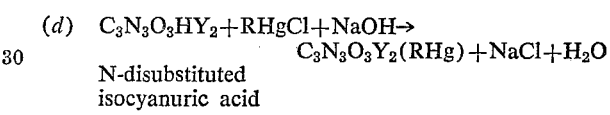
N-disubstituted isocyanuric acid The second mode of preparation can advantageously be employed especially where the Y substituents are sensitive to alkaline hydrolysis. In this method of procedure, the organo-mercuric hydroxides are used as substitution reagents. A solution of organo-mercuric hydroxide is added to a supersaturated solution of cyanuric acid or its Y N-substituted derivative in a suitable solvent. The reaction medium is heated to a temperature between 70° and 100° C. for a period raging from 30 minutes to 3 hours and advantageously from 1 hour to 2 hours and, after cooling and filtering, the reaction product is dried.

The reaction schemes for the various alternatives are visualized as follows:

(e) (CNOH)$_3$+3RHgOH→C$_3$N$_3$O$_3$(HgR)$_3$+3H$_2$O (f) C$_3$N$_3$O$_3$H$_2$Y+2RHgOH→C$_3$N$_3$O$_3$Y(HgR)$_2$+2H$_2$O (g) C$_3$N$_3$O$_3$HY$_2$+RHgOH→C$_3$N$_3$O$_3$Y$_2$(HgR)+H$_2$O

R in the preceding formulae represents lower alkyl (e.g. methyl, ethyl, propyl, butyl, isobutyl, etc.), phenyl, lower alkylphenyl (e.g. methylphenyl, ethylphenyl, etc.), halophenyl (e.g. chlorophenyl, etc.), phenyl(lower)alkyl (e.g. benzyl phenylethyl, etc.) or naphthyl. Y in the preceding formulae is —SCCl$_3$, —(CH$_2$)$_x$CH$_2$OH wherein $x$ is an integer of at most 3 (e.g., —C$_2$H$_4$OH, etc.), lower alkenyl (e.g. —CH$_2$CH=CH$_2$, etc.), —(CH$_2$)$_2$CN, —(CH$_2$)$_3$NH$_2$ and —(CH$_2$)$_2$COOH.

The yields relative to the starting reactants are in general quantitative, regardless of the method of preparation employed, and the obtained products are practically pure. Infrared spectrometric examination confirms that all the obtained derivatives result from N-substitution of the isocyanuric acid.

The products obtained according to the present invention can be used for protecting living or inert organic materials against fungal growth, notably in agriculture for the fungicidal treatment of seeds, the treatment of germinating beds against cryptogamic diseases and, in industry, for the protection against mushrooms and molds of perishable commercial materials such as wood, paper, fabrics, cordage, plastics, etc.

The following examples set forth, solely by way of illustration, presently-preferred embodiments of the invention. In these examples, parts by weight bear the same relation to parts by volume as do grams to milliliters. Percentages are by weight.

Example 1

While stirring, 12.9 parts by weight of cyanuric acid are introduced into 550 parts by volume of water containing 50 parts by volume of dimethylformamide, and the temperature is raised to 90° C. The pH of the reaction medium is brought to 9 and maintained at this level by introducing a 30% sodium carbonate solution while simultaneously and gradually adding 79.5 parts by weight of ethyl mercury chloride ($C_2H_5HgCl$) in one hour.

At the end of the reaction, the reaction mass containing the reaction product in suspension is cooled to 20° C., then filtered, 81.2 parts by weight of trisethyl-mercury isocyanurate of the following formula being obtained:

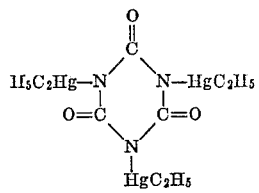

according to the results given by infrared spectrometric examination. The yield is 99.5%. The results of elemental analysis compared with the theoretical composition (figures between brackets) are as follows:

$C$=13.1% [13.2%]; $H_2$=1.8% [1.9%]; $N_2$=5.3% [5.2%]; $Hg$=73.8% [73.9%].

The procedure for the production of the cyanuric acid derivative of the present example can be easily adapted to commercial scale.

Example 2

To prepare commercially the product of Example 1, a reaction tank with stirring means and heated to 75°C. is supplied at the rate of 219 kg./hour with a 3% suspension of cyanuric acid in water, 175.6 kg./hour of solution containing 40.6 kg. of ethyl-mercury chloride in 135 kg. of ethanol and 20.83 kg./hour of 30% sodium hydroxide solution in order to keep the pH to a value close to 9.

The reaction time being about 30 minutes, the feeding rate is controlled so that the residence time in the apparatus is of the order of about 60 minutes.

After filtering, the product is dried, the filtrate is distilled to recover the solvent which is recycled, residual water charged with sodium chloride being discharged.

Under such conditions, producing 1 ton/day of trisethyl-mercury isocyanurate involves an overall consumption of 158 kg. of cyanuric acid, 975 kg. of ethyl-mercury chloride and 150 kg. of sodium hydroxide, the solvent being recovered at the end of the operation and recycled.

Similar adaptation of the following examples can also be carried out.

Example 3

By proceeding as in Example 1 but limiting to 53 parts by weight the amount of ethyl-mercury chloride, there are obtained, after filtering, 58.4 parts by weight of bis-ethyl-mercury isocyanurate of the following formula:

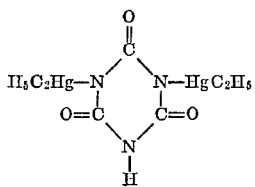

The yield is 99.7% and the product is practically pure as can be ascertained by the following elemental analysis compared with the theoretical composition (figures between brackets):

$C$=14.25% [14.3%]; $H$=1.91% [1.87%]; $N$=7.18% [7.16%]; $Hg$=68.5% [68.4%].

Example 4

By reacting, under similar operating conditions, 58.6 parts by weight of the product obtained in Example 3 with 31.3 parts by weight of phenyl-mercury chloride, there are obtained, with 99.2% yield, 85.5 parts by weight of N,N-1,5-ethyl-mercury-N-3-phenyl-mercury isocyanurate of the following formula:

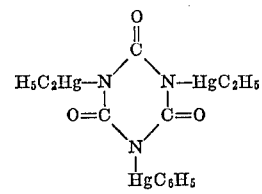

The following comparative results are given by the elemental and theoretical analyses:

$C$=18.05% [18.1%]; $H_2$=1.6% [1.7%]; $N_2$=4.9% [4.9%]; $Hg$=69.6% [69.7%].

Example 5

25.8 parts by weight of cyanuric acid are added to 1,000 parts by volume of an aqueous alcoholic solution containing 100 parts by volume of ethanol per liter and the mixture is heated to 75° C. 125.2 parts by weight of phenyl-mercury chloride are gradually added to the medium while keeping the pH at 9 by automatic addition of sodium carbonate solution and, after cooling and filtering, 153.3 parts by weight of practically pure bis-phenyl-mercury isocyanurate are obtained. The yield of the reaction is 99.2%. The formula of the product is as follows:

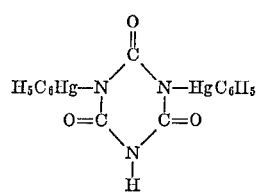

Example 6

By operating as in the foregoing examples, starting with 12.9 parts by weight of cyanuric acid suspended in a mixture of 500 parts by volume of water and 50 parts by volume of dimethylformamide heated to 80° C., then adding 72.6 parts of weight of naphthyl-mercury chloride, there are obtained, with 99.0% yield, 71.9 parts by weight of bis-naphthyl-mercury isocyanurate of the following formula:

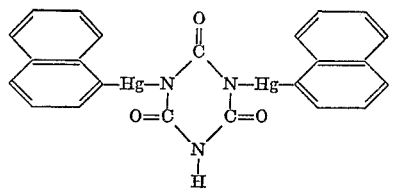

The results of the elemental analysis of the reaction product are as follows:

$C$=35.1%; $H_2$=1.92%; $N_2$=5.36%; $Hg$=51.2%.

Example 7

74 parts by weight of ethyl-emrcury hydroxide in 150 parts by volume of ethanol are added to a solution of 12.9 parts by weight of cyanuric acid in 100 parts by volume of dimethylformamide maintained at 70±5° C. The reaction proceeds for 3 hours and, after cooling, filtering and drying, there are obtained 79.8 parts by weight of tris-ethyl-mercury isocyanurate whereof purity characteristics are similar to those of the product described in Example 1. The yield is 97.0%.

Example 8

By operating under conditions similar to those of the foregoing example and substituting 88.5 parts by weight of phenyl-mercury hydroxide or ethyl-mercury hydroxide, there are obtained, with 96.5% yield, 92.5 parts by weight of tris-phenyl-mercury isocyanurate whereof elemental analysis compared with the theoretical composition is as follows:

C=26.1% [26.3%]; $H_2$=1.7% [1.6%]; $N_2$=4.4% [4.4%]; Hg=62.5% [62.7%].

Example 9

219 parts by weight of N-bis-hydroxyethyl-isocyanurate are dissolved in 1000 parts by volume of dimethylformamide and, while stirring, 1000 parts by volume of methanol containing 294.5 parts by weight of phenyl-mercury hydroxide is added. The reaction medium is brought to 75° C. for 3 hours, cooled, then filtered and 482 parts by weight of 1,5-N-hydroxyethyl-3-N-phenyl-mercury isocyanurate of the following formula are obtained:

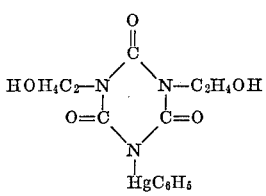

The overall yield is 97.5% and the results of the elemental analysis compared with the theoretical composition are as follows:

C=31.4% [31.6%]; $H_2$=3.05% [3.1%]; $N_2$=8.5% [8.5%]; Hg=40.4% [40.4%].

Example 10

While stirring 24.65 parts by weight of ethyl-mercury hydroxide are added to 42.8 parts by weight of bis(N-trichloromethyl-thoisocyanuric) acid dissolved in 200 parts by volume of chloroform, then heated by refluxing (60° C.) for 3 hours. After cooling, filtering and drying there are obtained, with 97.8% yield, 64.3 parts by weight of N-1,3-(trichloromethylthio)-5-ethyl-mercury isocyanurate of the following formula:

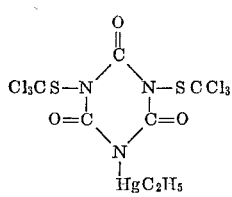

The results of elemental analysis compared with the theoretical composition are as follows:

Actual analysis: C, 12.7%, H, 0.8%, Cl, 32.3%; N, 6.3%; S, 9.6%; Hg, 30.6%. Theoretical analysis: C, 12.8%, H, 0.8%; Cl, 32.4; N, 6.4%, S, 9.7%, Hg, 30.5%.

Example 11

By following the procedure described in Example 1, from a solution containing 21.7 parts by weight of N-1,3-bis-hydroxyethyl-isocyanuric acid in 500 parts by volume of water and 50 parts by volume of dimethylformamide whereto 25.1 parts by weight of methyl-mercury are gradually added, temperature and pH being kept at 90° C. and 9 respectively, there are obtained after 60 minutes reaction, 41.6 parts by weight of N-1,3-hydroxyethyl-5-methyl-mercury isocyanurate of the following formula:

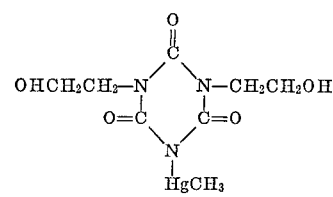

Yield is 96.5% and the results of elemental analysis compared with theoretical analysis are as follows:

Theoretical analysis: C, 22.2%; $H_2$, 3.0%; $N_2$, 9.7%; Hg, 46.4%. Actual analysis: C, 22.1%; $H_2$, 3.0%; $N_2$, 9.9%; Hg, 46.5%.

Example 12

43.1 parts by weight of N-1,3-di-allyl-5-ethyl-mercury isocyanurate are prepared, with 98.5% yield, by reacting, under the conditions described in Example 1, a mixture of 20.9 parts by weight of 1,3-N-di-allyl isocyanurate with 26.5 parts by weight of ethyl-mercury chloride in the presence of 500 parts by volume of water and 50 parts by volume of dimethylformamide.

The results, in agreement with the theoretical composition, are given by elemental analysis, according to the following formula:

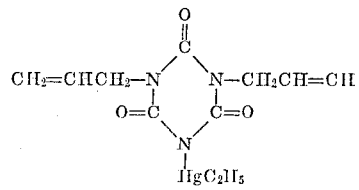

Example 13

The products obtained according to the present invention were tested to evaluate the fungicidal activity thereof on numerous fungus stocks such as *Alternaria pori, Molinia fructigena, Colletotrichum phomoïdes* and *Filletia caries*.

The tests were run in parallel according to conventional methods classically termed "by dilution" and "by incorporation in the medium", described more particularly in the paper by Wellman and McCallan (Contributions of Boyce Thompson Institute, vol. 3, No. 3, pp. 171–176).

The results shown in the table hereinafter are in average percentages of inhibition obtained at various concentrations of product [A] (bis-N-ethyl-mercury derivative); [B] (tris-N-ethyl-mercury derivative); [C] (bis-N-phenyl-mercury derivative); and [D] (tris-N-phenyl-mercury derivative).

| Concentration in p.p.m. | Product | Average percentage of inhibition | | | |
|---|---|---|---|---|---|
| | | Alternaria pori | Molinia fructigena | Collectotrichum phomoides | Filletia caries |
| 100 | A | 100 | 100 | 100 | 100 |
| | B | 100 | 100 | 100 | 100 |
| | C | 100 | 100 | 100 | 100 |
| | D | 100 | 100 | 100 | 100 |
| 50 | A | 100 | 100 | 100 | 100 |
| | B | 100 | 100 | 100 | 100 |
| | C | 100 | 100 | 100 | 100 |
| | D | 100 | 100 | 100 | 100 |
| 25 | A | 100 | 100 | 100 | 100 |
| | B | 100 | 100 | 100 | 100 |
| | C | 100 | 100 | 100 | 100 |
| | D | 100 | 100 | 100 | 100 |
| 10 | A | 99 | 100 | 100 | 98 |
| | B | 98 | 99 | 99 | 98 |
| | C | 99 | 100 | 100 | 100 |
| | D | 100 | 100 | 100 | 100 |
| 5 | A | 98 | 99 | 100 | 97 |
| | B | 97 | 98 | 98 | 98 |
| | C | 98 | 99 | 100 | 99 |
| | D | 100 | 100 | 100 | 100 |

Example 14

Other tests, run in parallel, were carried out in order to evaluate the toxicity towards warm-blooded animals and the phytotoxic power of isocyanuric acid derivatives which are the subject of the invention. The results thereof compared with those shown in the foregoing table establish that, contrary to known mercury compounds, these products exhibited much lower toxicity towards animals and practically ineffective phyticidal action.

By way of example, lethal dose 50 varies according to the tested derivatives between 100 mg./kg. of animal (mice and rats) with product A, 500 mg./kg. with product C and 1,000 mg./kg. with product D.

Likewise, the phytocidal action of the same derivatives where applied at the rate of 0.3% by weight of mercury, i.e. a hundred times the usual dose, to various needs, can be deduced from the table hereinafter, whereof the figures correspond to the percentage of germination 20 days after sowing the treated seeds:

| Tested product | Percent of germination (20 days after sowing) | | | |
|---|---|---|---|---|
| | Colza | Clover | Ryegrass | Maize |
| A | 84 | 93 | 86 | 94 |
| B | 81 | 93 | 81 | 88 |
| C | 88 | 94 | 98 | 90 |
| D | 86 | 92 | 95 | 90 |
| Untreated controls | 87 | 95 | 97 | 91 |

The fungicidally active compounds of the present invention can be applied to the various materials to be protected, within a relatively wide range of amounts. For the protection of seeds, for example, use is made of 50 to 500 grams (preferably 200 grams) per 100 kilograms of seed. In protecting soil, application is of the order of 20 to 200 grams of active compound per square meter of soil. For the protection of industrial organic material such as wood, paper, fabrics, ropes, plastic materials, etc. use is made of 2 to 15 grams of active compound per square meter of material.

What is claimed is:

1. An isocyanurate of the formula $$(CNO)_3H_mX_nY_p$$

wherein:

X is a monovalent R—Hg- radical, R being selected from the group consisting of lower alkyl, phenyl, lower alkylphenyl, halophenyl, phenyl(lower)alkyl and naphthyl, the Hg of the R—Hg- group being directly attached to N, and Y is a monovalent radical directly attached to N and being selected from the group consisting of —SCCl$_3$, —(CH$_2$)$_x$CH$_2$OH, —CH$_2$CH—CH$_2$, —(CH$_2$)$_2$CN, —(CH$_2$)$_3$NH$_2$ and —(CH$_2$)$_2$COOH, and wherein $x$ is less than or equal to 3, $m$ is at most 1, $n$ is one of the integers 1, 2, and 3, the sum of $m+n+p=3$, the R moieties being identical or different where $n$ is greater than 1.

2. A compound according to claim 1 and corresponding to the formula

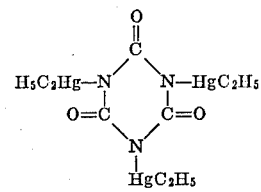

3. A compound according to claim 1 and corresponding to the formula

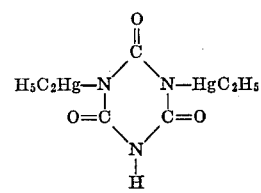

4. A compound according to claim 1 and corresponding to the formula

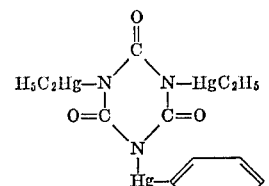

5. A compound according to claim 1 and corresponding to the formula

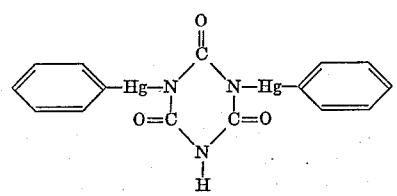

6. A compound according to claim 1 and corresponding to the formula

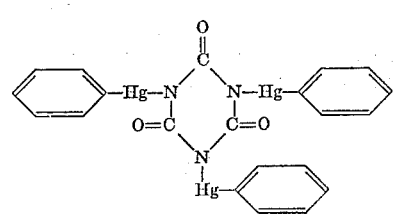

7. A compound according to claim 1 and corresponding to the formula

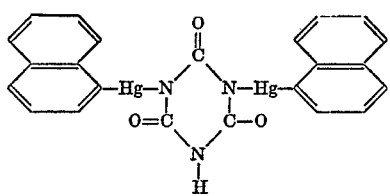

8. A compound according to claim 1 and corresponding to the formula

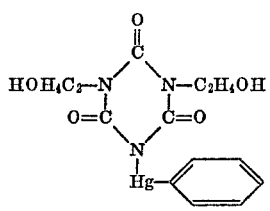

9. A compound according to claim 1 and corresponding to the formula

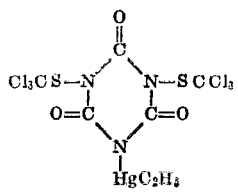

10. A compound according to claim 1 and corresponding to the formula

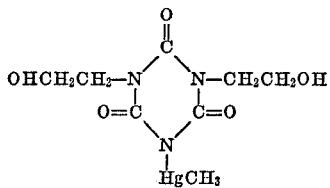

11. A compound according to claim 1 and corresponding to the formula

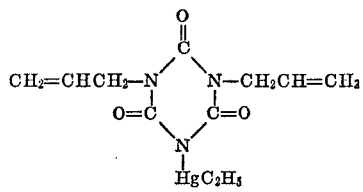

References Cited

UNITED STATES PATENTS

| | | | |
|---|---|---|---|
| 3,249,498 | 5/1966 | Matzner | 260—242 |
| 2,326,906 | 6/1967 | Stamm | 260—242 |

OTHER REFERENCES

Smolin et al.: S-Triazines (vol. 13 of the chemistry of heterocyclic compounds), page 390, N.Y., Interscience, 1958.

HENRY R. JILES, Primary Examiner

N. TROUSOF, Assistant Examiner

U.S. Cl. X.R.

260—248, 999